United States Patent [19]
Smith

[11] 4,219,729
[45] Aug. 26, 1980

[54] METHOD OF ALIGNING AND LOCATING THE MIRRORS OF A COLLECTOR FIELD WITH RESPECT TO A RECEPTOR TOWER

[76] Inventor: Otto J. M. Smith, 612 Euclid Ave., Berkeley, Calif. 94708

[21] Appl. No.: 916,134

[22] Filed: Jun. 16, 1978

[51] Int. Cl.² .............................................. G01J 1/20
[52] U.S. Cl. ................................. 250/203 R; 126/425; 126/439
[58] Field of Search ............... 356/141, 152, 399, 400, 356/401; 250/201, 203; 126/270, 271

[56] References Cited
U.S. PATENT DOCUMENTS

| | | | |
|---|---|---|---|
| 3,432,671 | 3/1969 | Edmonds | 356/152 |
| 3,470,377 | 9/1969 | Le Febre et al. | 356/400 |
| 3,494,699 | 2/1970 | Gloge | 356/152 |
| 3,549,890 | 1/1969 | Keller | 250/223 B |
| 4,144,505 | 3/1979 | Angelbeck et al. | 356/152 |

*Primary Examiner*—David C. Nelms
*Attorney, Agent, or Firm*—Flehr, Hohbach, Test, Albritton & Herbert

[57] ABSTRACT

A method of surveying a solar field which has a large number of heliostats using a laser beam which originates directly below the heat receptor on the tower and can be controlled to aim towards any one of the mirrors in the field. The reflected light from this mirror is analyzed, with an array of photocells which are mounted on the doors which close across the window of the heat receptor, to control both the azimuth and elevation of both the mirror and the laser gun in order to cause the beam to be aimed at the center of the mirror and the laser image centered on the receptor. This permits surveying the field for the purpose of using computer control of the mirror during normal daytime operation.

Moreover, not only is the array of photocells on the window used for surveying the field during night time operation, but they are also used to determine the coordinate transformation between the geometry of the field and the geometry of the earth by tracking the sun during daytime operation. Lastly the system with a microprocessor on each heliostat is used for tracking the sun in an open control mode for all normal hours of operation of the power plant.

20 Claims, 10 Drawing Figures

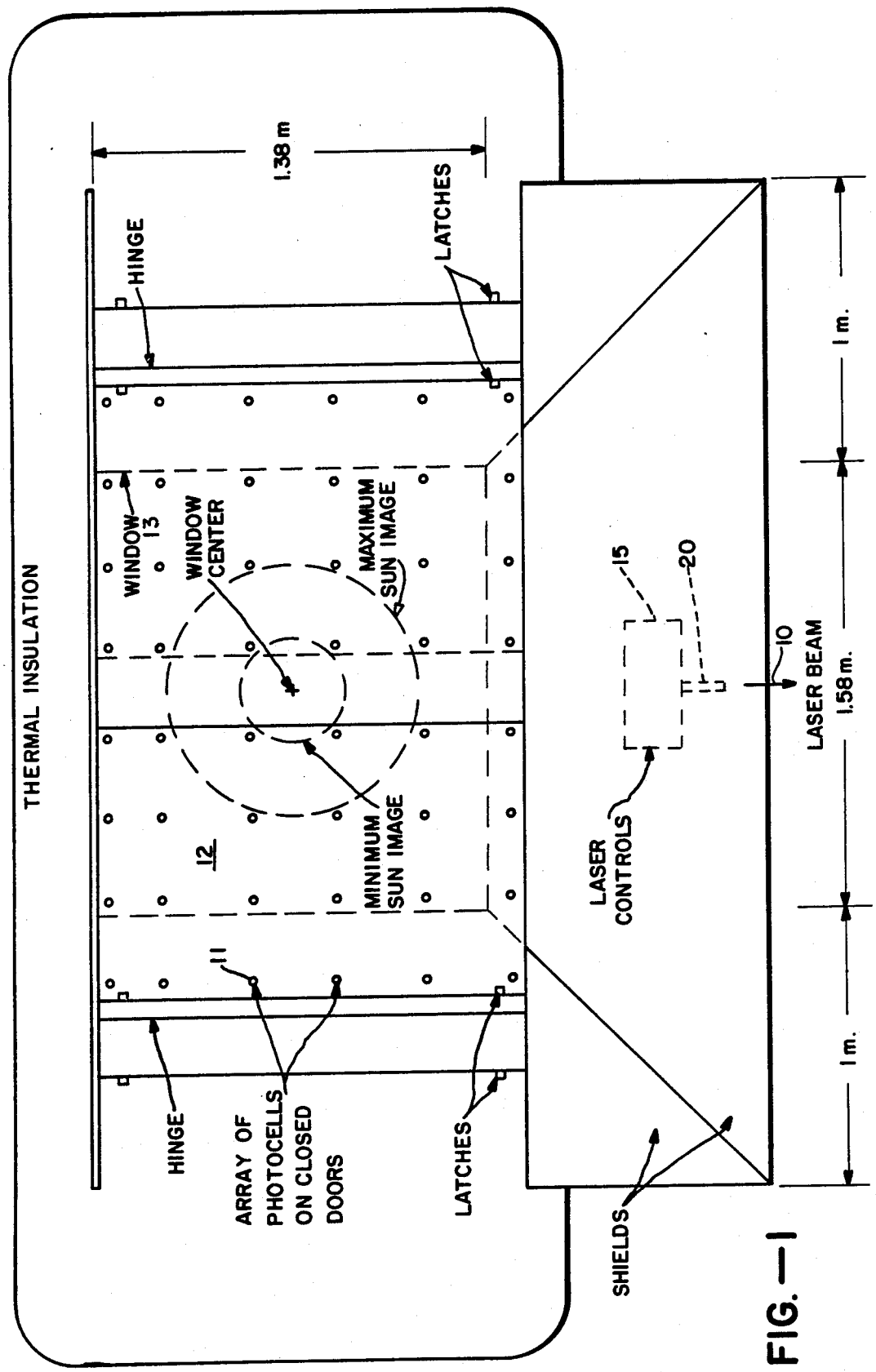
FIG.—1

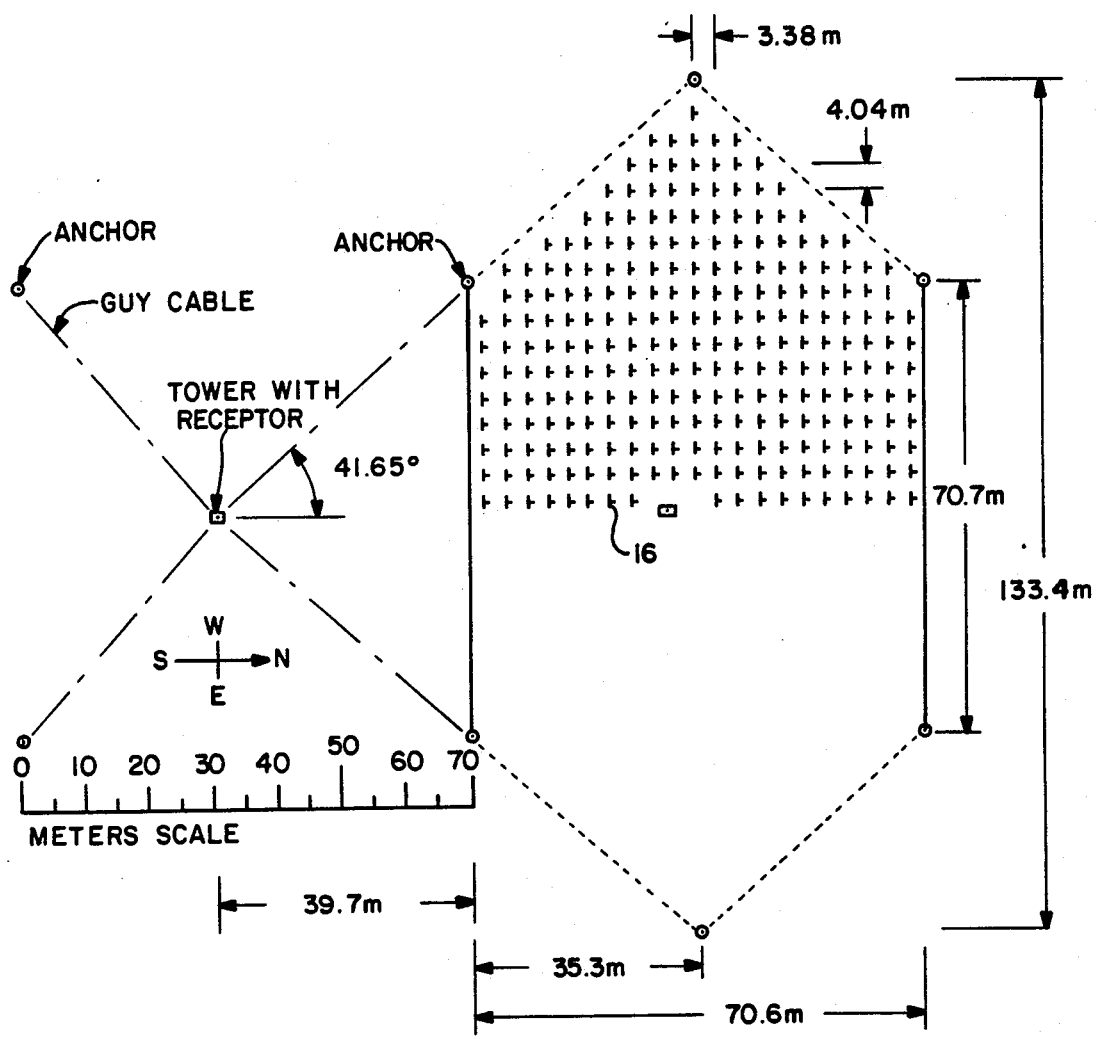
FIG.—2
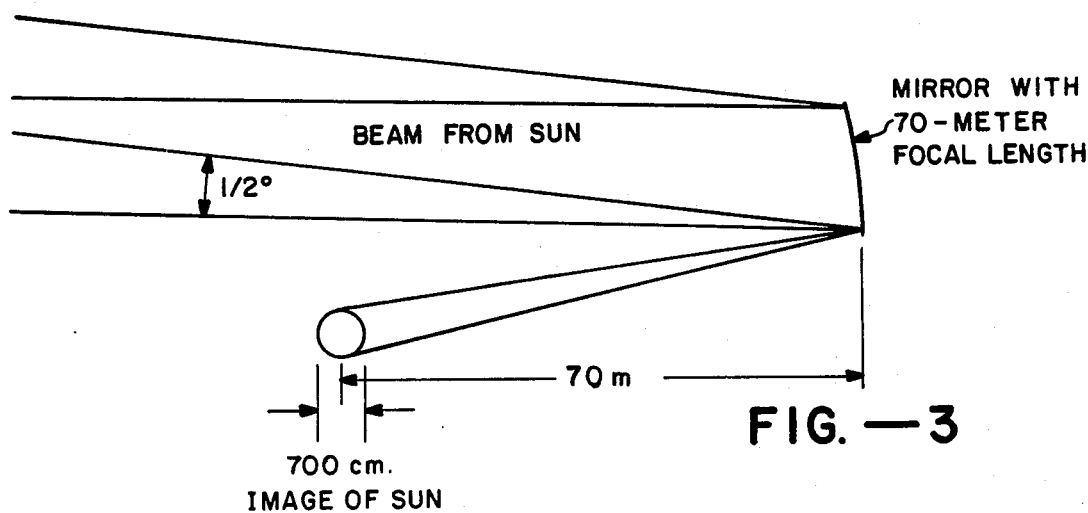
FIG.—3

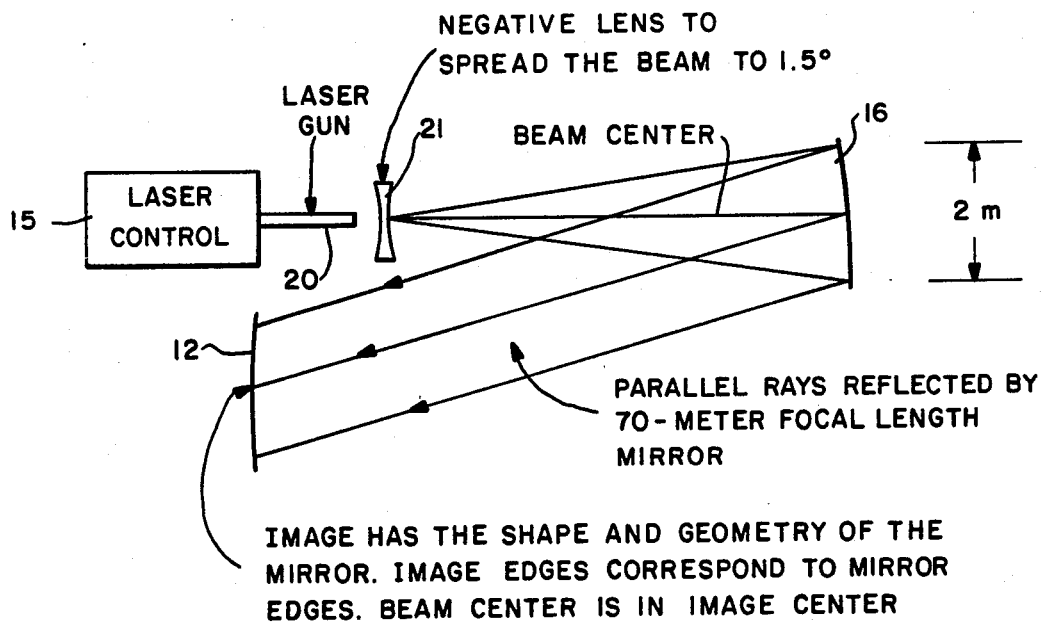
FIG. — 4
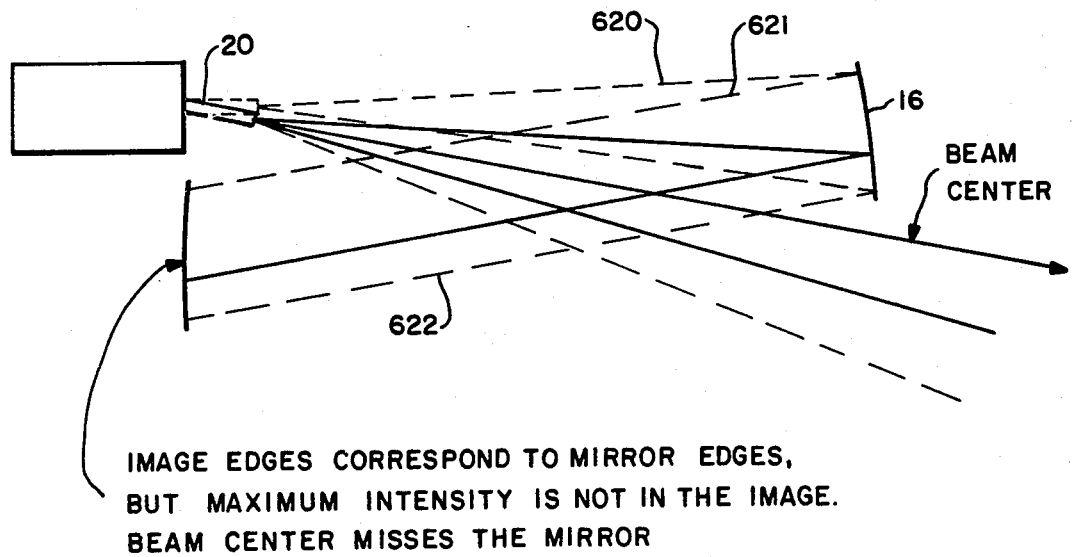
FIG. —4A

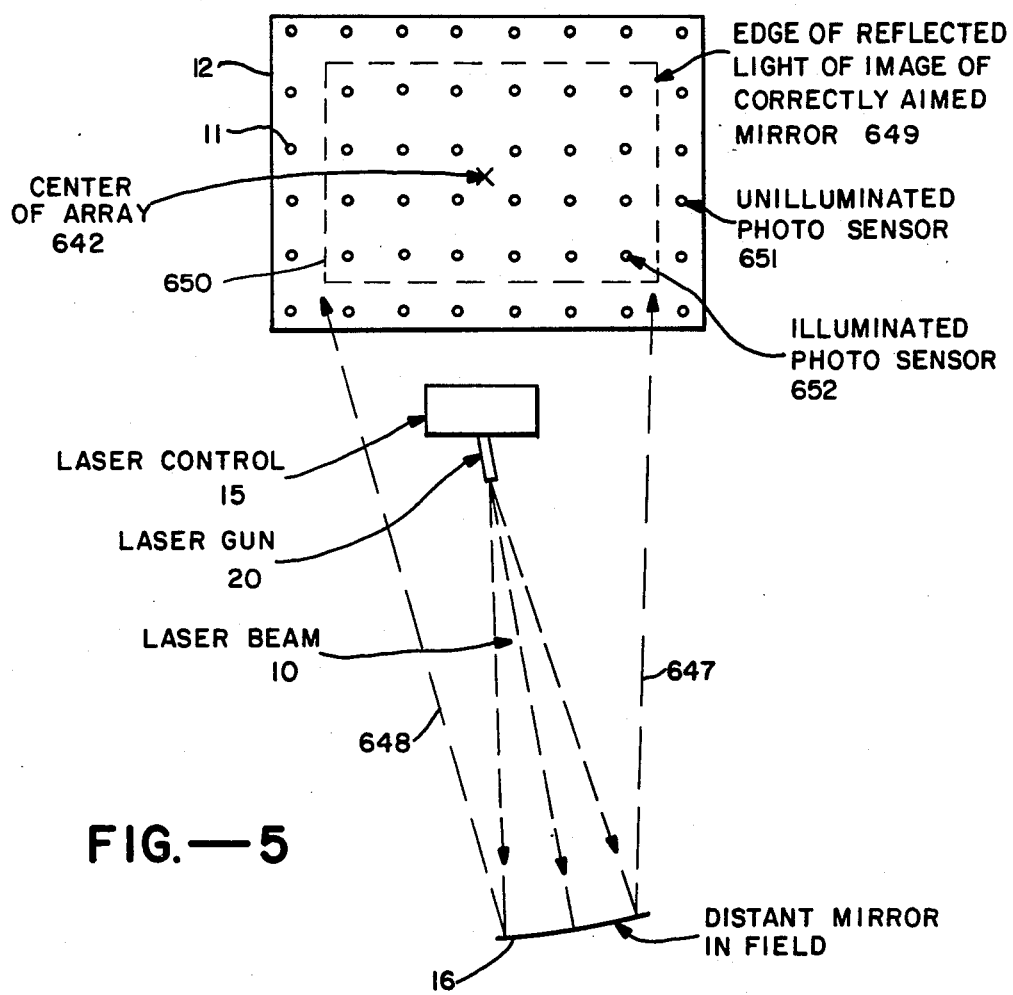
FIG.—5
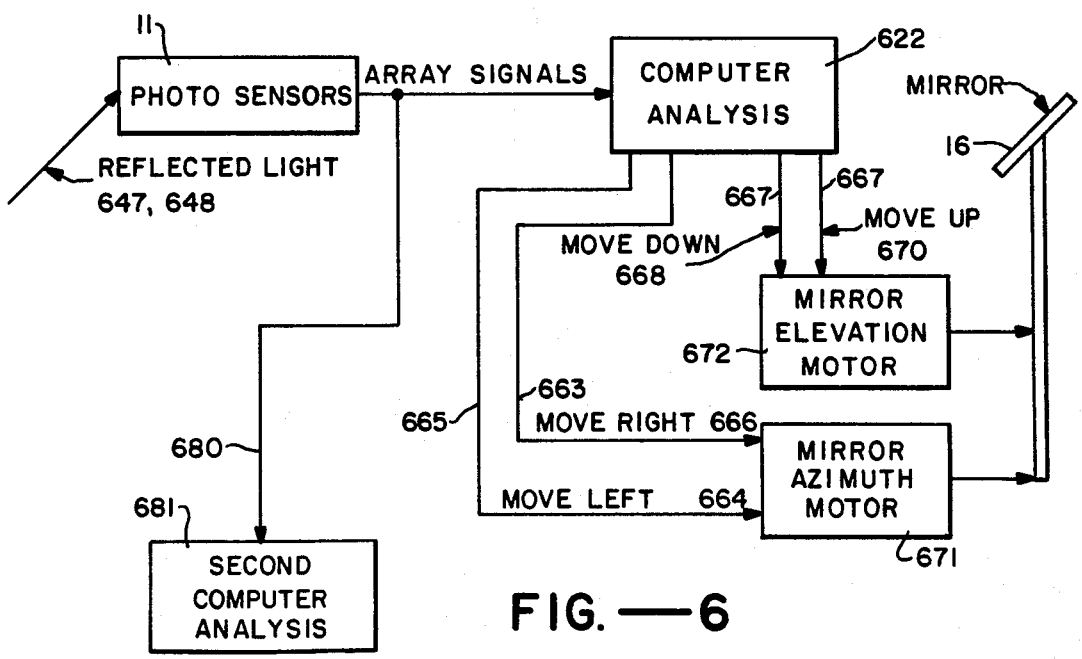
FIG.—6

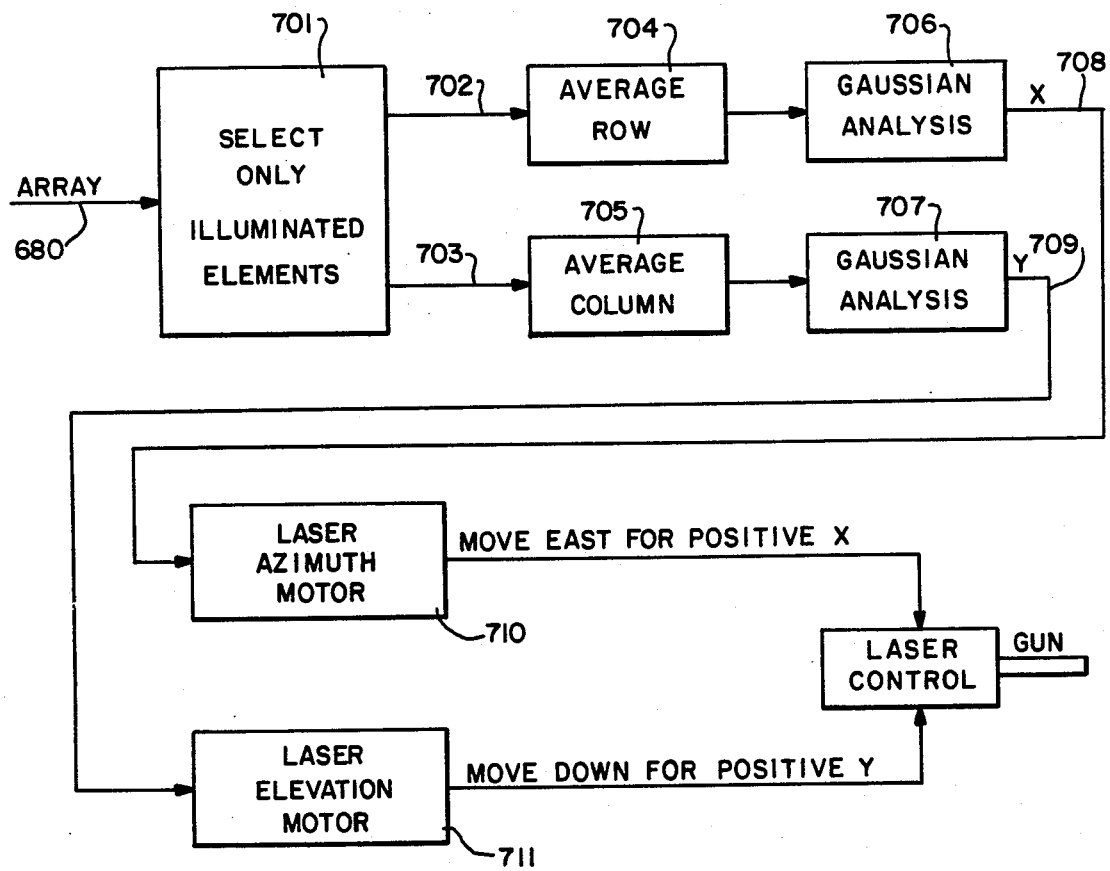
FIG.—7
SECOND COMPUTER ANALYSIS
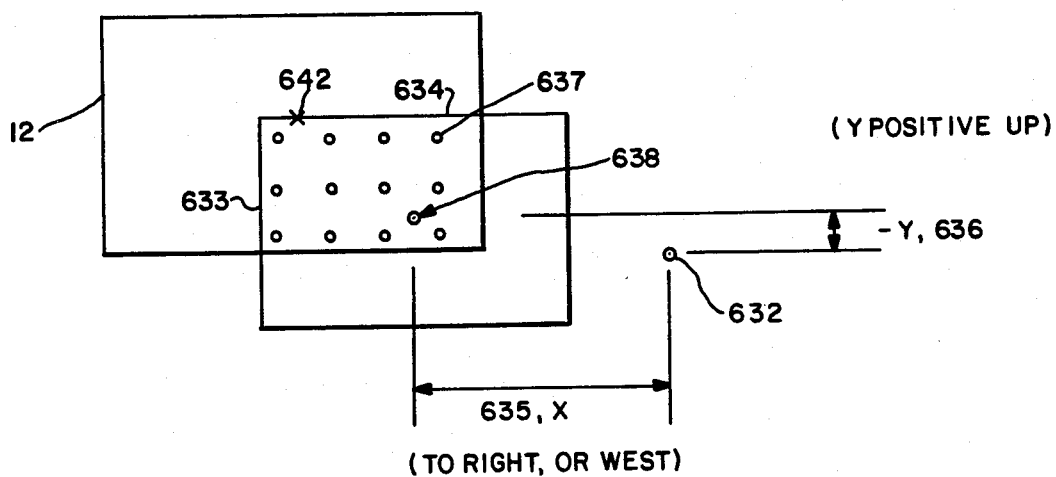
FIG.—8

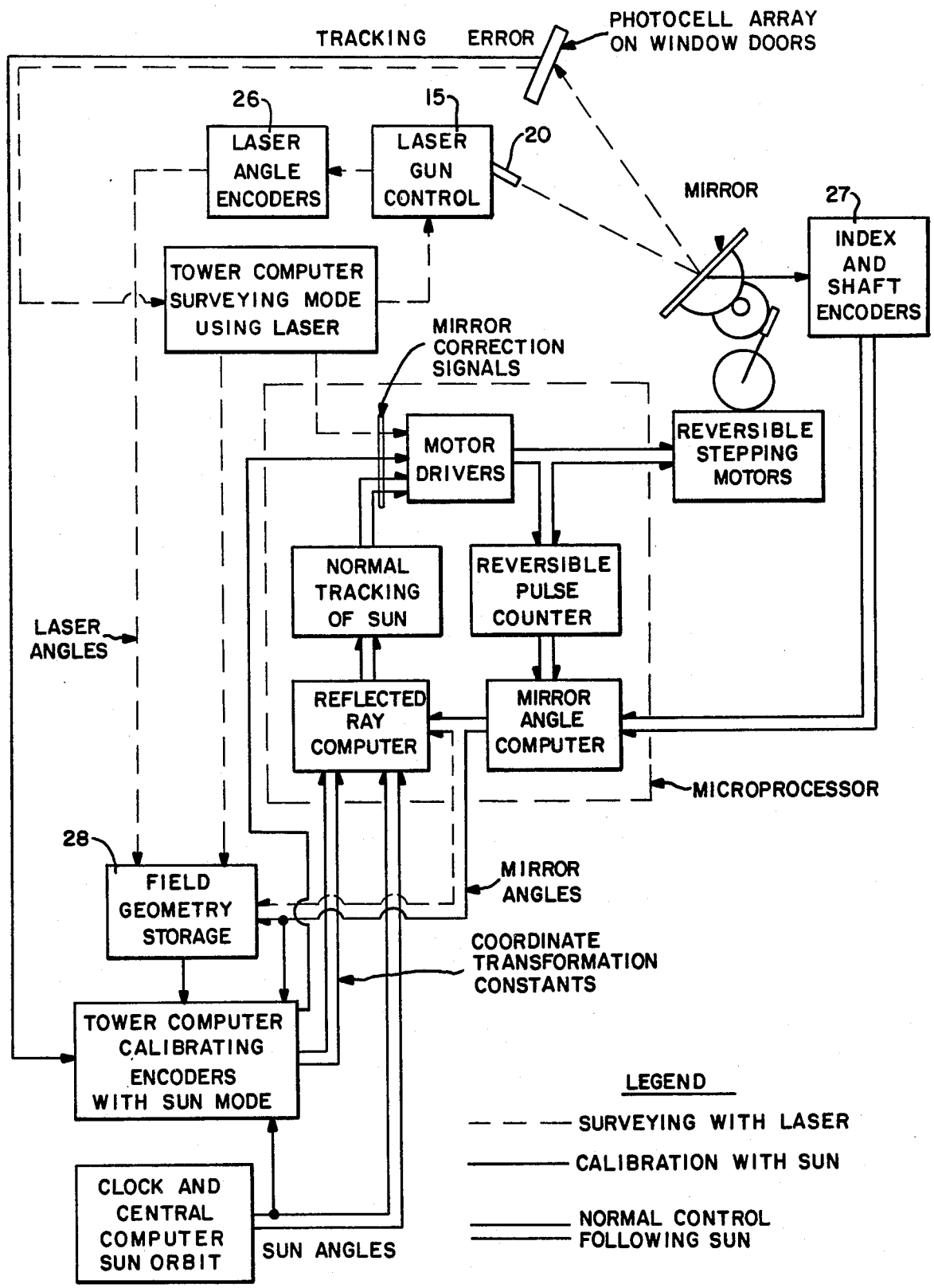
FIG.—9

METHOD OF ALIGNING AND LOCATING THE MIRRORS OF A COLLECTOR FIELD WITH RESPECT TO A RECEPTOR TOWER

BACKGROUND OF THE INVENTION

The present invention is directed both to apparatus and a method for aligning and locating the mirrors of a collector field of a solar energy system with respect to a receptor tower.

In the past to determine geometrical information concerning the location and alignment of such mirrors, surveyors have physically entered the field to measure and calibrate shaft encoders. Moreover, the physical location of each mirror has been precisely surveyed beforehand. Thus installation is critical. Moreover, if the system gets out of alignment, the foregoing procedure must be repeated.

OBJECT AND SUMMARY OF THE INVENTION

It is, therefore, a general object of this invention to provide an improved apparatus and method of aligning and locating the mirrors of a collector field of a solar energy system with respect to a receptor tower.

Accordingly, there is provided a method of aligning and locating the mirrors of a collector field of a solar energy system with respect to a receptor tower. A light beam is directed from the tower toward a mirror. The reflected image of the mirror is sensed and the mirror moved to center its image on the receptor. The light beam is also centered on the mirror.

From an apparatus standpoint there is provided apparatus for aiming the solar collector mirrors of a solar power plant on a receptor tower. A photocell array is substantially coextensive with the window of the receptor. A laser beam source is in proximity to the window aimed at a mirror. Means sense the mirror image of the laser beam on the photocell array and the mirror is moved to center its image on the array.

BRIEF DESCRIPTION OF THE DRAWINGS

FIG. 1 is an elevation view of a receptor of the present invention;

FIG. 2 is a plan view of a mirror field and associated receptor;

FIG. 3 is a sketch useful in understanding the invention;

FIG. 4 is another sketch useful in understanding the invention;

FIG. 4A is another sketch useful in understanding the invention;

FIG. 5 is an elevation view similar to FIG. 1;

FIG. 6 is a schematic illustrating one part of the control system of the present invention;

FIG. 7 is a schematic illustrating another part of the control system of the present invention;

FIG. 8 is a diagram useful in understanding FIG. 7; and

FIG. 9 is a block diagram and flow chart of the overall system of the present invention.

DETAILED DESCRIPTION OF THE PREFERRED EMBODIMENT

FIG. 1 shows the north elevation to a windowed receptor with laser controls 15 under it for producing a laser beam 10 from a gun 20 directed at a field of mirrors. Such beam's reflected image is sensed by the array 11 of photocells on the closed doors 12 of the receptor which are coextensive with its window 13. The geometrical relationship between the mirror field and the receptor on the tower is shown in copending patent applications Ser. Nos. 717,641 and 737,489, filed Aug. 25, 1976, and Nov. 1, 1976, respectively.

FIG. 2 shows the arrangement of heliostats 16 (i.e., mirrors which follow the sun) in a field of 70 meters north/south and 133 meters east/west extent and their relationship to a tower which is 39.7 meters to the south of the south edge of this field. This field of heliostats can be constructed without any prior surveying in accordance with the technique of the present invention. That is, every foundation will be cast in place by an automatic machine like a corn planting machine and there will be no knowledge about the location of the foundations of the pedestals of the heliostats nor the position of the pedestal or whether it is aligned vertically or whether it is misaligned. Consequently the goal of the surveying procedure in this invention is to find the geometrical relationship between the tower with the receptor and each of the 500 mirrors indicated in FIG. 2.

Now, referring to one and only one mirror 16 in the field shown in FIG. 2, FIG. 3 shows the way in which light from the sun hitting a mirror which has been chosen at about the middle of the field in FIG. 2 with a nominal 70 meter focal length will cause the sun's light to be focused into an image of the sun which will be approximately 700 centimeters in diameter. If the mirror is properly oriented this image of the sun would be on the window of the receptor in the tower. The important concept illustrated by FIG. 3, however, is the geometry of the relationship between the image and the beams coming from the sun. Essentially, parallel beams from the sun would focus to a single point at the 70 meter focal distance from the mirror and beams from the sun subtending an angle of $\frac{1}{2}°$, the apparent diameter of the sun's disc, would focus to a $\frac{1}{2}°$ diameter image of the sun at the 70 meter focal length distance away from the mirror.

Now referring to FIG. 4 and to the action of the laser gun 20 which is mounted underneath the tower receptor as shown in FIG. 1 the laser gun can send a beam of light towards the selected mirror 16. In the absence of a lens inserted into this beam of light, the light will appear to come from a point source and the mirror receiving light from a point source will then generate parallel rays of light which would go off into infinity. It would not form a well-defined image. We have provided in this invention a negative lens 21 which will spread the laser beam of light in a gaussian distribution fashion in two dimensions to provide a beam which has the inflection point of the beam intensity at the edges of the mirror. That is in the horizontal direction the inflection points of the gaussian distribution of light will be approximately 2 meters apart and in the vertical direction the inflection point of the gaussian distribution of beam intensity will be approximately 1.2 meters apart. FIG. 4 is representational showing the distribution of light across a mirror of 2 meters extent with the center of the beam coming close to the center of the mirror. All of the beams that come from this negative lens will be reflected into a collection of parallel rays coming from the mirror and these beams will not form a well-defined image. But instead this group of parallel rays will pass off into infinity unless they are intercepted by some object.

As illustrated in FIG. 1 the intercepting object will be the doors 12 of the receptor on the tower which is covered with an array 11 of photosensors to detect whether or not the laser beam has been sent to these photosensors. When these parallel rays strike the photosensors they will illuminate only the portion that has been derived from the mirror. Thus the image that is the illuminated area of the intercepted rays will have exactly the same geometry as the geometry of the mirror. If the mirror is 2 meters wide by 1.2 meters tall then the parallel rays will form an illuminated rectangle 2 meters wide and 1.2 meters tall and this illuminated rectangle should ideally be in the middle of the the doors of the heat receptor on the tower to accurately calibrate the azimuth and elevation of the mirror.

However, FIG. 4A illustrates the situation when the laser beam center does not intercept the mirror that is intended to reflect the light towards the tower. This means that the azimuth and elevation of the gun 20 cannot yet be used to geometrically locate the mirror with respect to the receptor tower. The beam center is lost but some of the rays that are off the center of the beam will illuminate the mirror and these lower intensity rays as shown diagrammatically in FIG. 4A by ray 620 will be reflected as ray 621 and will be intercepted by the receptor. In a similar manner a ray 622 from the other edge of the mirror will be intercepted. These lower intensity rays will outline an image which will be again of the same geometry as the mirror itself; namely, 2 meters wide by 1.2 meters tall so that the image edges correspond in a 1 to 1 relationship with the mirror edges. But the maximum intensity will not be within the image edges if the beam center does not in fact fall on the mirror.

The foregoing thus illustrates that a correction is first necessary in mirror aiming to align the image with the window of the receptor and then the laser gun must be properly aimed.

FIG. 5 illustrates the position of the reflected light image when it is correctly aligned. The physical structure of the receptor door is shown as 12. The array 11 of photocells mounted on this door is 6 and 8 columns making 48 photocells. The center of the array of photocells is a hypothetical point in the middle of the door marked 642. The laser control 15 (see FIG. 1) is mounted underneath the receptor. The resultant cone of light falls on a distant mirror 16 in the field and the reflected light from the western edge of the mirror is the ray 647 and the reflected light from the eastern edge of the mirror is the ray 648. These two rays produce respectively the edges of the image as it appears on the photosensor structure. Ray 647 produces the edge 649 of the reflected light of the image when it is correctly aimed by the mirror and ray 648 produces the edge 650 of the reflected light. The image appears as a rectangle on the array of photocells. The array of photocells has been so chosen such that there is a column of photocells outside of the illuminated rectangle at both the east and west edges of the receptor and there is a row of photocells unilluminated at the bottom and top of this array such that we can detect with the photocells the location of the edges 649 and 650 and the top and bottom edges also. The photosensor 651 is shown in the unilluminated region and the photosensor 652 is shown in the illuminated region. The control system that is used to control the mirror is based on an analysis of the edges of the imaged rectangle.

FIG. 6 shows the block diagram of the control system. The reflected light consists of the entire rectangle of which beams 647 and 648 are components. The photosensors 11 are the entire array of photosensors shown in FIG. 5. The array signals are the set of 48 amplitude signals delivered by the photosensors and these are passed to the computer 662 which analyzes these signals to deliver four separate command signals. These command signals are respectively 663, which is move to the left and has been abbreviated for FORTRAN notation as MOVLEFT (664). In a similar manner channel 665 is carrying the move right signal 666, channel 667 is carrying the move down signal 668 and channel 669 is carrying the move up signal 670. Channels 663 and 665 terminate at the azimuth motor 671. This motor will either rotate the mirror to the right or to the left depending upon the signals 664 or 666. Elevation motor 672 receives channels 667 and 669 which contain respectively commands move down 668 or move up 670. Although software computer programs of this type are probably readily written in Fortran by a person skilled in the art the use of edge control is unique and the use of a feedback system from one edge of a rectangle is also unique. Normally in FORTRAN, information is provided to the program by means of a read command. In this particular case the information would be provided by a signal channel from the minicomputer on the tower to the microprocessor located at the mirror and controlling the elevation motor and the azimuth motor.

The array signals 661 are also provided on channel 680 to a second computer analysis unit 681. This second cmputer analysis examines the intensity of the signals in this array to properly aim the laser gun at the center of the mirror.

FIG. 7 details the second computer analysis 681 in conjunction with the diagram of FIG. 8. On the receptor door 12 is a reflected image with the edges 633 and 634. Thus the mirror is also misaligned. The signals available are analyzed to determine the apparent center 632 of the beam if it were reflected by the mirror. The analysis to determine this apparent center proceeds as follows. Only the photosensors which are illuminated will be analyzed as indicated by block 701 in the flow chart of FIG. 7. These photosensors are shown diagrammatically as the sensors 637 in FIG. 8. There are both rows and columns of these illuminated photosensors. If all of the signals in each column are added there are four numbers which are equivalent to the average of one of the rows. If all of the signals in each row are added there are three numbers which are equivalent to the columns. These mathematical operations are shown in the flow chart as blocks 704, 705. If the numbers for an average row have a maximum, then this maximum is the apparent center of the beam center from the laser gun. If the numbers in the average column have a maximum then this maximum is the apparent center of the reflected beam center from the laser gun. In the general case, however, neither of these averages will have a maximum. The distribution is gaussian and the average row distribution is therefore analyzed (blocks 706, 707) assuming that it is a portion of the side of a gaussian distribution to calculate the apparent center or to calculate the apparent abscissa of the maximum of this distribution. In other words, the average row is analyzed to obtain a number which is equal to the apparent X coordinate of the apparent beam center which is shown in FIG. 8 as the length 635 and which is labeled X. The average column numbers are analyzed in a similar fashion to find the apparent distance to the apparent peak of this gaussian distribution and that analysis yields the distance Y, shown in FIG. 8 as 636.

In FIG. 7 these analyses yield the signals X and Y. Note that in FIG. 8 the vector 635 is +X whereas the vector 636 is −Y since it is pointing down.

It can be seen that the laser gun therefore is aiming its apparent center to point 632 whereas it should be aiming its apparent center to point 638 which is the center of the rectangle of reflected light in the mirror.

The laser gun should therefore be moved to produce a change in the azimuth of the amount X towards the east and should be moved to produce a change in the elevation of the amount −Y which in this case is up. This X signal is delivered to the laser azimuth motor 710 which produces a motion of the laser gun towards the east of the amount X such that the beam is moved from the azimuth position of 632 to the azimuth position of 638 which is the center of the reflected rectangle of light of the array. Similarly channel 709 drives the laser elevation motor 711 which will move the laser gun down for positive Y or will move it up for negative Y. The two motor operations in FIG. 7 move the center of the laser beam so that it does in fact go to the exact center of the mirror and consequently will appear in the receptor at point 638 in the event that the mirror doesn't move.

But the mirror also moves, under the control of the system of FIG. 6, from point 638, which is the center of the rectangle of reflected light, to point 642 which is the center of the array. Consequently, the combination of the effect of the mirror moving the rectangle of light to be centered on the sensors and the laser moving the center of the laser beam into the center of this reflected rectangle will cause the maximum intensity of the composite reflected light to be at point 642 as shown in FIG. 5 in the center of the array of photosensors and the beam from the laser will be pointed accurately at the center of the mirror and the mirror will be accurately aligned to reflect this to the receptor.

In summary the control system, therefore, is a noninteracting multi-variable control system providing for different kinds of analysis of the photosensor signals to provide for both control of the laser beam and for control of the mirror such that at the end of the operation of the system the mirror will be correctly aligned to the center of the window of the receptor and the laser will be correctly aligned to the center of the mirror.

As illustrated in FIG. 9 after the laser mirror system has reached equilibrium the angle encoders 26 of the laser are read and the angle encoders 27 of the mirrors are read and information from the mirror angles and information from the laser angles are both stored in the field geometry storage 28 for the purpose of being able to use this field geometry in tracking the sun. Thus there is now a fixed relationship between the gun control, the mirror control, the laser angle encoders, and the mirror angle encoders which is stored in a central computer. In this case, it would be in the minicomputer located on the tower of this particular field.

After the laser angles and mirror angles have been delivered to the field geometry storage 28 there are stored in this computer storage four numbers associated with one mirror. One more number stored is the distance from that mirror to the laser beam. That has not been included in this detailed description. However, it can be obtained from the knowledge of the height of the tower above the ground. Knowing the heights of the laser gun and the window receptor, from those two distances there can easily be computed the complete geometry of the location of every mirror with respect to the tower. Thus the control system of FIG. 9 would be used repetitively in a search mode for each of the 500 mirrors in the field in FIG. 2. There would be stored, therefore, in the minicomputer on the tower 2,500 constants representing the geometry of the field.

After doing the above night time calibration with the laser there is an operation during the daytime with the photosensors on the receptor door functioning and one and only one mirror tracking the visible sun and shining its light onto the photosensors as shown in FIG. 1. The photosensors are now used in a proportional mode to cause the beam of sun light to be centered on the window. Such control technique is similar to FIG. 6 and its associated program. FIG. 9 illustrates this sun mode by a single solid line. Thus by tracking the sun with a single mirror and picking up the image with an array of photocells the geometrical transformation between the geometry of the field and the geometry of the earth is determined.

What is claimed is:

1. Apparatus for aiming the solar collector mirrors of a solar power plant at a receptor on a tower comprising:
   a photocell array substantially coextensive with the window of said receptor;
   a laser beam source in proximity to said window aimed at a mirror;
   means for sensing the mirror image of said laser beam on said photocell array and means for moving said laser beam to the center of said mirror such means being responsive to said photocell array sensing the deviation of intensities of said laser beam to center such beam.

2. Apparatus as in claim 1 where said laser beam includes a negative lens to spread said beam.

3. Apparatus as in claim 1 where said array is in rows and columns and said means for sensing is responsive to an edge of said image causing adjacent rows and columns of photocells to be respectively illuminated and unilluminated.

4. A method of control of a light beam for illuminating a mirror of a solar energy system comprising the following steps:
   directing a light beam toward a selected mirror;
   multiply sensing the reflected images from said mirror;
   discriminating between first sensor responses nonresponsive to said light beam and second sensor responses responsive to both said light beam and said mirror,
   analyzing said second sensor responses,
   and changing the direction of said light beam responsive to said second sensor responses to increase the illumination of said mirror.

5. A method as in claim 4, in which the said second sensor responses of the multiple sensors are analyzed with respect to a preselected angular intensity distribution of said light beam, determining the position of the center of said light beam with respect to the center of said mirror,
   and changing the direction of said light beam to cause the center of said light beam to coincide with the center of said mirror.

6. A method as in claim 5, in which the said second sensor responses are analyzed to determine the reflected position of the edge of said mirror, analyzing the said second sensor responses to determine the reflected position of the beam center of said light beam, calculating the angular difference between the said reflected position of the edge and the said reflected position of the beam center, and controlling the light beam angle in response to said difference.

7. A method as in claim 6, in which the said reflected position of the edge is analyzed to determine a mirror angular error;

controlling the mirror angle to cause the said reflected images to move, and controlling the mirror to cause the reflected position of the edge to move to a preselected relationship between said first sensor responses and said second sensor responses.

8. A method as in claim 4, where said light beam has an axis of control in which a first set of second sensor responses distributed along the axis of control are combined with a second set of second sensor responses also distributed along the axis of control, said second set being displaced from said first set in a direction orthogonal to said axis of control.

9. A method as in claim 4, including the step of angularly spreading the said light beam so that a substantial quantity of illumination impinges near the peripheral edges of said mirror.

10. A method as in claim 4, including the step of angularly spreading the said light beam in two orthogonal axes so that the entire surface of said mirror is illuminated.

11. In a solar energy system with multiple mirrors, a receptor on a tower, and an array of light sensors on said tower, a method of control of a mirror comprising the following steps:

directing a light beam toward a selected mirror to illuminate said mirror, multiply sensing the reflected images from said mirror, discriminating between first sensor responses non-responsive to said light beam and second sensor responses responsive to both said light beam and said mirror, analyzing said second sensor responses, determining the reflected position of the edge of said mirror, and controlling the angle of said mirror in response to said reflected position.

12. A method as in claim 11, in which said mirror is controlled to cause the said reflected position of the said edge to move to a preselected relationship between said first sensor responses and said second sensor responses.

13. A method as in claim 12, including the steps of:

analyzing said second sensor responses for a second reflected position of a second edge of said mirror, and controlling the angle of said mirror in response to both reflected positions to cause said reflected positions to be symmetrical with respect to the center of said array.

14. A method as in claim 12, including the steps of:

analyzing said second sensor responses for a second reflected position of a second edge of said mirror;

said second edge having an angular displacement with respect to said first edge, controlling a first angle of said mirror in response to the reflected position of the first edge of said mirror, and controlling a second angle of said mirror in response to the reflected position of the second edge of said mirror.

15. A method as in claim 11, including the steps of:

analyzing said second sensor responses to determine the difference between the position of the center of said light beam and the center of said mirror, and changing the direction of said light beam responsive to said difference to cause said difference to be reduced.

16. A method as in claim 15, including the steps of sensing and storing the azimuth and elevation angles of both said light beam and said mirror.

17. A method as in claim 15, including the steps of thereafter using one mirror to center the image of the sun at a preselected point in said array, and sensing and storing the azimuth and elevation angles of said mirror.

18. A method as in claim 16, in which the sun's orbit is stored in a computer including the step of commanding the azimuth and elevation of many of said multiple mirrors to follow the sun taking into account said stored azimuth and elevation angles, to superimpose solar images at a predetermined position with respect to said receptor.

19. A method as in claim 18 including the step of using one mirror to center the image of the sun on said array, and sensing and storing the azimuth and elevation angles of such mirror whereby the geometrical transformation between the geometry of the field and the geometry of the earth may be determined.

20. In a solar energy system with a mirror, a receptor on a tower, a light source, an array of light sensors on said tower, an angular control of said light source, and an angular control of said mirror, a method of control comprising the steps of:

directing a light beam toward said mirror, angularly spreading said beam to illuminate a substantial area of said mirror, multiply sensing the reflected images from said mirror by said array, selecting a set of responses from said array in one axis, analyzing the edge of said set to determine the angle of said mirror, analyzing the distribution of responses of said set to determine the relationship between the center of the light beam and the center of the mirror, controlling the angle of the light beam from said relationship, and controlling the angle of the mirror from said edge of said set.

* * * * *